United States Patent
Kunimatsu et al.

(10) Patent No.: US 10,072,741 B2
(45) Date of Patent: Sep. 11, 2018

(54) TENSIONER

(71) Applicant: TSUBAKIMOTO CHAIN CO., Osaka-shi, Osaka (JP)

(72) Inventors: Kohei Kunimatsu, Osaka (JP); Masanori Watanabe, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 172 days.

(21) Appl. No.: 15/221,966

(22) Filed: Jul. 28, 2016

(65) Prior Publication Data

US 2017/0030434 A1    Feb. 2, 2017

(30) Foreign Application Priority Data

Jul. 31, 2015   (JP) ................................. 2015-151482

(51) Int. Cl.
*F16H 7/22* (2006.01)
*F16H 7/08* (2006.01)

(52) U.S. Cl.
CPC ......... *F16H 7/0848* (2013.01); *F16H 7/0838* (2013.01); *F16H 2007/0812* (2013.01); *F16H 2007/0859* (2013.01)

(58) Field of Classification Search
CPC ..... F16H 2007/0859; F16H 2007/0806; F16H 2007/0812; F16H 7/0848; F16H 7/0836
USPC ....................................................... 474/110
See application file for complete search history.

(56) References Cited

U.S. PATENT DOCUMENTS

| | | | | | |
|---|---|---|---|---|---|
| 4,874,352 | A | * | 10/1989 | Suzuki | F16H 7/0848 474/110 |
| 4,894,047 | A | * | 1/1990 | Breon | F16H 7/08 474/110 |
| 4,963,121 | A | * | 10/1990 | Himura | F16H 7/08 474/110 |
| 4,997,411 | A | * | 3/1991 | Breon | F16F 1/08 474/110 |
| 5,676,614 | A | * | 10/1997 | Inoue | F16H 7/08 474/110 |
| 5,707,309 | A | * | 1/1998 | Simpson | F16H 7/08 474/110 |
| 5,720,684 | A | * | 2/1998 | Mott | F16H 7/0848 474/101 |
| 6,053,831 | A | * | 4/2000 | Boedo | F16H 7/0848 474/109 |

(Continued)

FOREIGN PATENT DOCUMENTS

| | | |
|---|---|---|
| JP | 9-119491 A | 5/1997 |
| JP | 2002-206603 A | 7/2002 |

(Continued)

*Primary Examiner* — Henry Y Liu
(74) *Attorney, Agent, or Firm* — Westerman, Hattori, Daniels & Adrian, LLP

(57) ABSTRACT

Provided is a simple-structured tensioner that can reduce processing and assembling workload as well as increase the degree of design freedom. A tensioner 10 includes an oil supply hole 33 formed in a sleeve bottom 32 and a check valve 50 disposed on a front face of the sleeve bottom 32. The check valve 50 includes a check ball 51 and a retainer 52. The sleeve bottom 32 includes a ball seat 34 which protrudes in a cylindrical shape toward the front side integrally with and continuously from the edge of the oil supply hole 33 and on which the check ball 51 is seated.

4 Claims, 4 Drawing Sheets

(56) References Cited

U.S. PATENT DOCUMENTS

| | | | | |
|---|---|---|---|---|
| 6,196,939 B1* | 3/2001 | Simpson | F16H 7/0848 | 474/101 |
| 6,203,461 B1* | 3/2001 | Watanabe | F16H 7/0848 | 474/110 |
| 6,322,468 B1* | 11/2001 | Wing | F16H 7/08 | 474/109 |
| 6,398,682 B1* | 6/2002 | Suzuki | F16H 7/08 | 474/110 |
| 6,811,505 B2* | 11/2004 | Hashimoto | F16H 7/0848 | 474/109 |
| 6,935,978 B2* | 8/2005 | Hayakawa | F16H 7/0836 | 474/109 |
| 7,001,295 B2* | 2/2006 | Hashimoto | F16H 7/0848 | 474/109 |
| 7,226,376 B2* | 6/2007 | Konishi | F16H 7/0836 | 474/110 |
| 7,351,170 B2* | 4/2008 | Namie | F16H 7/0848 | 474/110 |
| 7,427,249 B2* | 9/2008 | Yoshida | F16H 7/0836 | 474/110 |
| 7,468,012 B2* | 12/2008 | Hayami | F16H 7/0836 | 474/110 |
| 7,513,842 B2* | 4/2009 | Yoshida | F16H 7/0836 | 474/110 |
| 7,608,004 B2* | 10/2009 | Yoshida | F16H 7/0836 | 474/110 |
| 7,713,155 B2* | 5/2010 | Namie | F16H 7/0836 | 474/110 |
| 7,850,559 B2* | 12/2010 | Botez | F16H 7/0848 | 474/101 |
| 7,927,242 B2* | 4/2011 | Namie | F16H 7/0848 | 474/101 |
| 8,323,135 B2* | 12/2012 | Namie | F16H 7/0836 | 474/101 |
| 8,734,278 B2* | 5/2014 | Ishii | F16H 7/0848 | 474/110 |
| 8,926,460 B2* | 1/2015 | Kurematsu | F16H 7/0848 | 411/518 |
| 8,939,856 B2* | 1/2015 | Kurematsu | F16H 7/0836 | 474/101 |
| 8,951,154 B2* | 2/2015 | Konuma | F16H 7/0848 | 474/110 |
| 2002/0022541 A1* | 2/2002 | Ullein | F16H 7/0836 | 474/110 |
| 2002/0098932 A1* | 7/2002 | Hashimoto | F16H 7/0848 | 474/110 |
| 2002/0142871 A1* | 10/2002 | Namie | F16H 7/0836 | 474/110 |
| 2004/0266571 A1 | 12/2004 | Izutsu et al. | | |
| 2005/0014587 A1* | 1/2005 | Konishi | F16H 7/0836 | 474/110 |
| 2008/0207365 A1* | 8/2008 | Namie | F16H 7/0836 | 474/110 |
| 2008/0220918 A1* | 9/2008 | Namie | F16H 7/0836 | 474/110 |
| 2008/0318717 A1* | 12/2008 | Kurematsu | F16H 7/0848 | 474/110 |

FOREIGN PATENT DOCUMENTS

| | | |
|---|---|---|
| JP | 2003-202060 A | 7/2003 |
| JP | 2008-208945 A | 9/2008 |
| JP | 2009-2495 A | 1/2009 |

* cited by examiner (a)  (b)

Related Art

Related Art

TENSIONER

BACKGROUND OF THE INVENTION

1. Field of the Invention

The present invention relates to a tensioner that provides appropriate tension to a running chain, belt, or the like.

2. Description of the Related Art

It has been common practice to use a tensioner for maintaining appropriate tension in a chain or the like. For example, a known chain guide mechanism, which slidably guides a transmission chain, such as an endless roller chain passing over respective sprockets of a crankshaft and of a cam shaft inside an engine room, uses a tensioner to bias a tensioner lever in order to maintain appropriate tension of the chain or the like.

The known tensioner 510 used in such a chain guide mechanism includes, as shown schematically in FIG. 4, a tensioner body 520 having a body hole 521 that is open on one side, a plunger 540 slidably inserted in the body hole 521, and a biasing unit 560 that biases the plunger 540 toward a front side (see, for example, Japanese Patent Application Laid-open No. 2009-002495).

In such a tensioner 510, oil is supplied to an oil pressure chamber 511 formed between the body hole 521 and the plunger 540, so that the plunger 540 is biased toward the front side by the oil in the oil pressure chamber 511. As the plunger 540 reciprocates, the oil flows through the small gap between the plunger 540 and the body hole 521, and the flow resistance provides the damping effect of slowing down the reciprocal movement of the plunger 540. A check valve 550 (schematically shown as a check ball alone) is disposed in the body hole 521. The check valve 550 allows the oil to flow in from the outside into the oil pressure chamber 511, and prevents the oil from flowing out from an oil supply hole 522.

One problem with the tensioner 510 is that, since the tensioner body 520 is a die-cast product made of cast iron or aluminum alloy, the body hole 521 in which the plunger 540 slides needs to be subjected to film formation by coating, or smoothing, or machining and the like, in order to achieve surface precision and durability for the purpose of preventing wear and seizure of the plunger 540. When the tensioner body 520 and the plunger 540 are made from different materials, there will be a difference in the degree of thermal deformation, and this difference in thermal deformation may adversely affect the sliding properties or damping characteristics of the plunger 540 relative to the tensioner body 520.

It has been proposed to use a metal sleeve, which is a separate component, to be interposed between the inner circumferential surface of the body hole and the outer circumferential surface of the plunger so as to allow selection of material for the tensioner body and to achieve a certain degree of design freedom with respect to the treatment of the inner circumferential surface of the body hole (see, for example, Japanese Patent Application. Laid-open No. 2002-206603).

In this tensioner described in Japanese Patent Application Laid-open No. 2002-206603, a hole is formed in the tensioner body with a smaller diameter than that of the body hole to be used as a part for setting a check valve in position.

In some designs of use that are adopted in recent years, the tensioner body is not attached to an engine block but instead a sleeve is directly attached to the engine block. In such a case, a check valve 650 should desirably be accommodated also inside a sleeve 630 as shown in an example for reference of FIG. 5 to facilitate the work of attaching the tensioner to the engine block.

In the tensioner 610 shown in FIG. 5, a counterbore is formed in the front face of the sleeve bottom 632 to provide a sleeve recess 632a, and a ball seat 653 on which a check ball 651 is seated is disposed in this sleeve recess 632a. The check ball 651 is seated at the front end of the ball seat 653. The movement of the check ball 651 is restricted by disposing a retainer 652 on the front side of the check ball 651.

SUMMARY OF THE INVENTION

In the tensioner 610 shown in FIG. 5, however, there is a risk that, if there is formed a gap between the sleeve recess 632a and the ball seat 653, the oil may leak out from the gap. The problem is that, the respective seal surfaces of the sleeve recess 632a and the ball seat 653 (more specifically, the bottom face of the sleeve recess 632a and the lower face of the ball seat 653) must be formed highly precisely.

The ball seat 653 must be pressed toward the rear side by a biasing unit 660 (coil spring 660 in the example shown in FIG. 5) because if the ball seat 653 moves up from the sleeve recess 632a, there will be formed a gap between the sleeve recess 632a and the ball seat 653. As a result, the degree of design freedom is compromised and the assembling work of the tensioner 610 is made more difficult. There is also a possibility of a gap being formed between the sleeve recess 632a and the ball seat 653 if the coil spring 660 loses some of its spring force due to elongation of the chain or by some other factors.

The present invention is directed at solving these problems and it is an object of the invention to provide a simple-structured tensioner that can reduce the processing and assembling workload as well as increase the degree of design freedom.

The present invention solves the problems described above by providing a tensioner including: a sleeve having a sleeve bottom on a rear side; a plunger inserted in the sleeve so as to be able to move forward and backward along an axial direction of the sleeve; and a biasing unit that is accommodated so as to be able to expand and contract inside an oil pressure chamber formed between a rear end of the sleeve and a rear end of the plunger and that biases the plunger toward a front side. An oil supply hole is formed in the sleeve bottom. A check valve for preventing oil from flowing out from the oil supply hole is disposed on a front face of the sleeve bottom. The check valve includes a check ball, and a retainer disposed on the front face of the sleeve bottom and restricting movement of the check ball. The sleeve bottom includes a ball seat which protrudes in a cylindrical shape toward the front side integrally with and continuously from an edge of the oil supply hole and on which the check ball is seated.

According to one aspect of the present invention, the sleeve bottom includes a ball seat which protrudes in a cylindrical shape toward the front side integrally with and continuously from an edge of the oil supply hole and on which the check ball is seated. Thereby, the number of component parts is reduced and the operation workload associated with the assembling work is reduced. In addition, since the risk of oil leakage through between the sleeve and the ball seat can be eliminated, the degree of precision required in the formation of various constituent elements is lowered. Also, since there is no need to consider the possibility of the ball seat being lifted up, a biasing unit for pressing the ball seat against the sleeve bottom is not necessary, and accordingly the degree of design freedom can be increased.

The ball seat is formed in the sleeve bottom that has a smaller thickness, and protrudes in a cylindrical shape toward the front side integrally with and continuously from an edge of the oil supply hole. Therefore, the ball seat can be formed by a drawing process, and so the production workload can be reduced.

The check valve is disposed inside the sleeve, so that, after the plunger and check valve have been installed in the sleeve, these components can be handled as one unit. Therefore, the operation workload associated with the attachment work even when the sleeve is directly attached to the engine block or the like can be reduced.

According to another aspect of the present invention, a tapered portion with its diameter increasing from the front side toward the rear side is formed on the rear side of the oil supply hole, so that the oil can be smoothly supplied from the outside into the oil supply hole. When the ball seat is formed by a drawing process, such a tapered portion can be formed on the rear side of the oil supply hole without performing any additional process, so that an increase in the production workload can be avoided.

According to another aspect of the present invention, the ball seat and the skirt decrease in diameter from the front side toward the rear side. Therefore, in assembling the tensioner, the check ball and the retainer can be retained to the sleeve by fitting the retainer onto the ball seat after disposing the check ball on the ball seat, and thus the plunger, coil spring, and others can be assembled easily into the sleeve.

According to another aspect of the present invention, the skirt includes a plurality of circumferentially arranged slits extending from a rear end of the skirt toward the front side. As the slits allow the skirt of the retainer to be radially elastically expanded, the retainer can be fitted onto the ball seat easily.

DESCRIPTION OF THE PREFERRED EMBODIMENTS

A tensioner 10 according to one embodiment of the present invention will be described with reference to the drawings.

Figure 1:
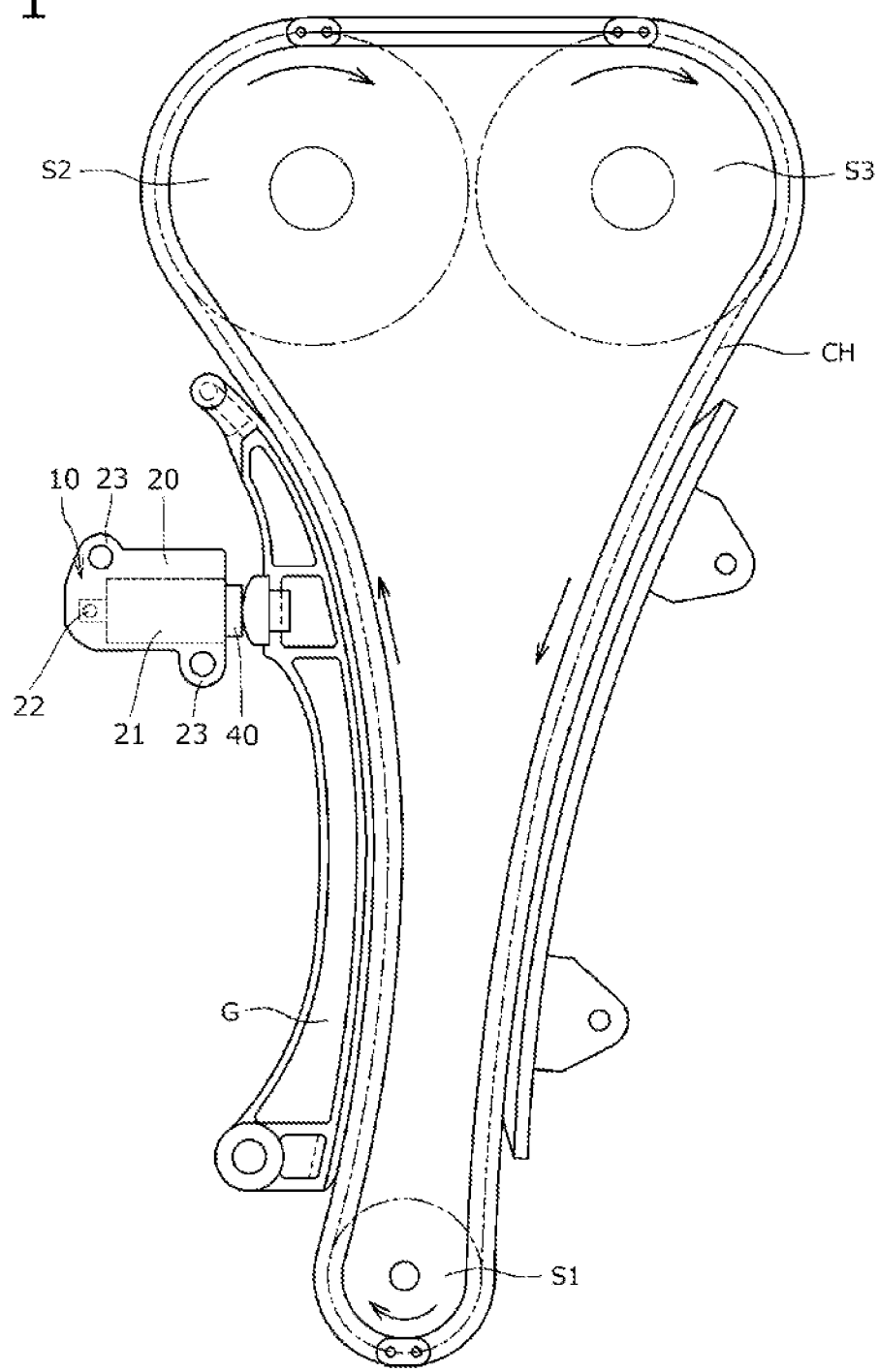
FIG. 1 is an illustrative diagram showing a timing system in which a tensioner according to one embodiment of the present invention is incorporated.

First, the tensioner 10 of this embodiment is incorporated in a chain transmission used in a timing system or the like of a car engine. As shown in FIG. 1, the tensioner is attached to an engine block (not shown) to apply appropriate tension to the slack side of a transmission chain CH passing over a plurality of sprockets S1 to S3 via a tensioner lever G to reduce vibration during the drive.

Figure 2:
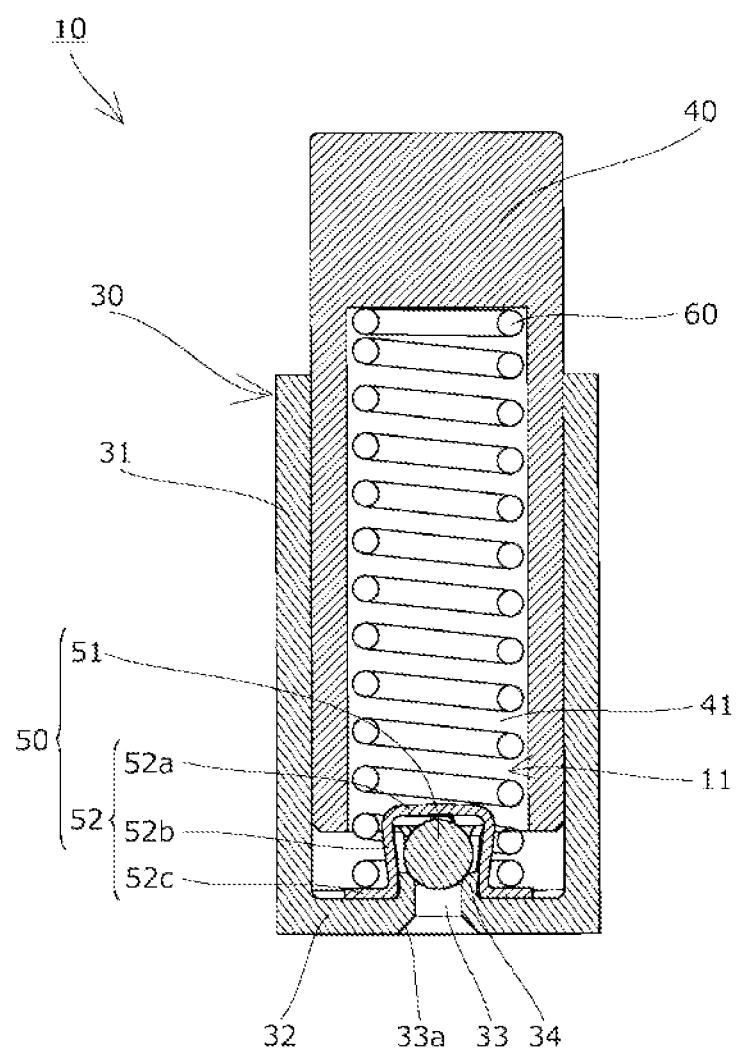
FIG. 2 is a cross-sectional view illustrating the tensioner.
Figure 3:
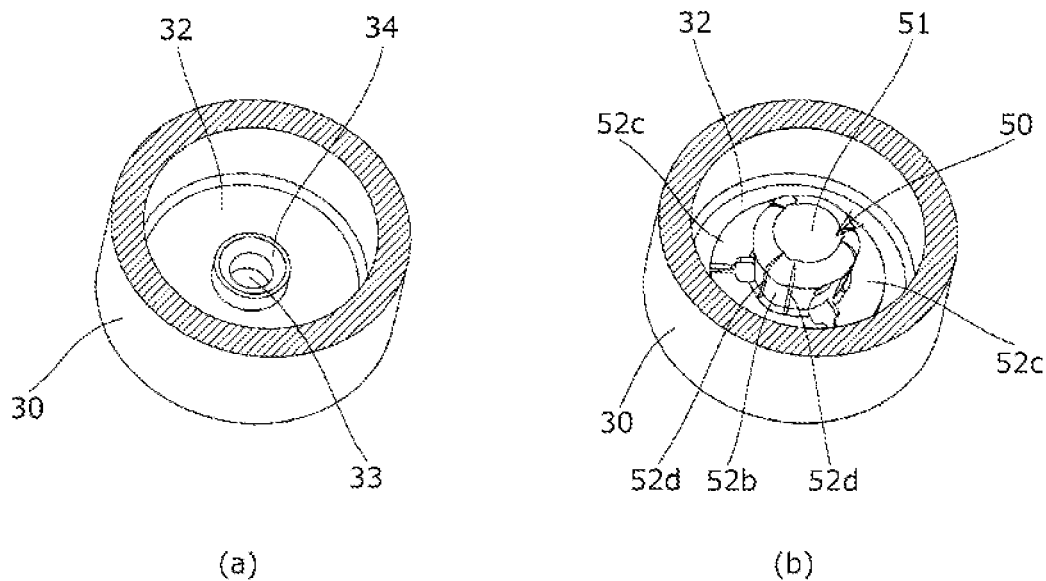
FIG. 3 is a cross-sectional perspective view illustrating the rear end of a sleeve.
Figure 4:
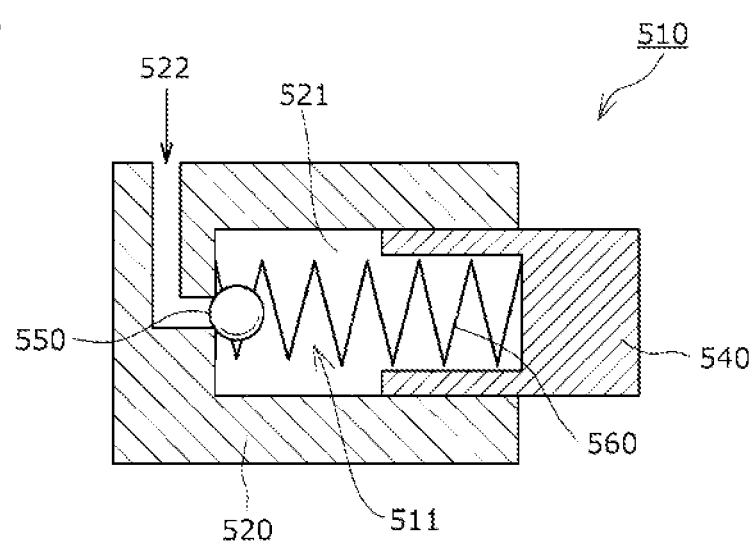
FIG. 4 is a cross-sectional view illustrating a conventional tensioner.
Figure 5:
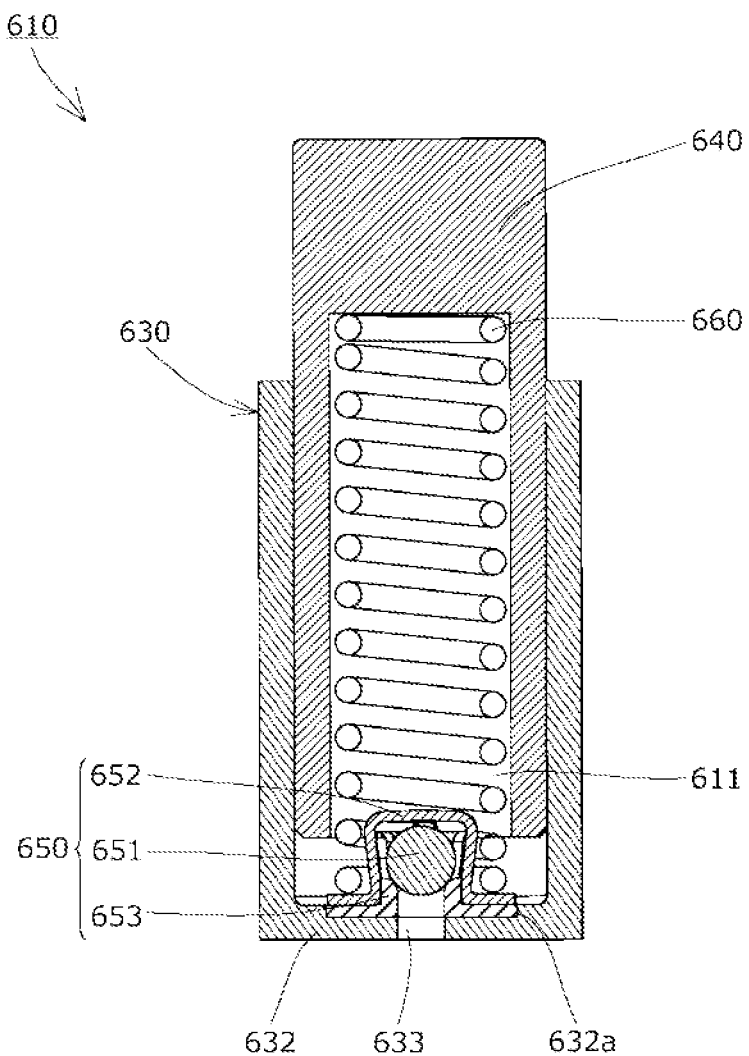
FIG. 5 is a cross-sectional view illustrating an example of a tensioner for reference.

The tensioner 10 includes, as shown in FIG. 1 to FIG. 3, a tensioner body 20 having a body hole 21, a sleeve 30 inserted in the body hole 21, a plunger 40 inserted in the sleeve 30 so as to be able to move forward and backward along the axial direction of the sleeve 30, a check valve 50, and a coil spring 60 as a biasing unit that is accommodated so as to be able to expand and contract inside an oil pressure chamber 11 formed between the rear end of the sleeve 30 and the rear end of the plunger 40 and that biases the plunger 40 toward a front side (protruding side).

Hereinafter, various constituent elements of the tensioner 10 will be described with reference to the drawings.

The tensioner body 20 is made from an aluminum alloy, synthetic resin, and the like, and includes, as shown in FIG. 1, the body hole 21 that is open, on one (front) end, an oil supply hole 22 that extends through an outer wall of the tensioner body 20 to the body hole 21, and a mounting part 23 having a mounting hole for a bolt or the like to be passed through to secure the tensioner body 20 to an engine block.

The sleeve 30 is made from a metal such as iron or the like and includes the cylindrical sleeve body 31, and a sleeve bottom 32 formed integrally at the rear end of the sleeve body 31, as shown in FIG. 2 and FIG. 3.

As shown in FIG. 2 and FIG. 3, an oil supply hole 33 is formed in the sleeve bottom 32 for supplying oil into the oil pressure chamber 11 from the outside. This oil supply hole 33 communicates with the oil supply hole 22 of the tensioner body 20 with the sleeve 30 being disposed in the tensioner body 20.

In the sleeve bottom 32 is also formed, as shown in FIG. 2 and FIG. 3, a ball seat 34 protruding in a cylindrical shape toward the front side integrally with and continuously from the edge of the oil supply hole 33. This ball seat 34 functions as a seat for the check ball 51 of a check valve 50 which will sit on the front end thereof. The ball seat 34 is formed by a drawing process wherein the sleeve bottom 32 is pressed from the rear face toward the front face, and as a result of this drawing process, a tapered portion 33a with its diameter increasing from the front side toward the rear side is formed on the rear side of the oil supply hole 33. The ball seat 34 decreases in diameter from the front side toward the rear side.

The plunger 40 is made from a metal such as iron or the like and has a plunger hole 41 inside, which is open on the rear side as shown in FIG. 2 and FIG. 3.

The check valve 50 allows the oil to flow in from the outside through the oil supply holes 22 and 33 into the oil pressure chamber 11, and prevents the oil from flowing out from the oil supply holes 22 and 33. As shown in FIG. 2 and FIG. 3, the check valve is disposed on the front face of the sleeve bottom 32.

As shown in FIG. 2 and FIG. 3, the check valve 50 is made up of a spherical check ball 51 that is seated on the front end of the ball seat 34 to be capable of tightly contacting therewith, a retainer 52 attached on the front face of the sleeve bottom 32 to restrict the movement of the check ball 51, and a ball spring (not shown) disposed between the check ball 51 and the retainer 52. The ball spring (not shown) is provided to bias the check ball 51 toward the ball seat 34, but the ball spring (not shown) may not necessarily be provided. The check ball 51 and the retainer 52 are made of metal.

The retainer 52 includes, as shown in FIG. 2 and FIG. 3, a substantially disc-like top 52a disposed on the front side of the check ball 51, a skirt 52b extending vertically downward toward the rear side from the peripheral edge of the top 52a and arranged on the radially outer side of the ball seat 34, and a plurality of flanges 52c extending radially outward from the rear end of the skirt 52b. The skirt 52b decreases in diameter from the front side toward the rear side, and includes a plurality of circumferentially arranged slits 52d extending from the rear end toward the front side (front end) of the skirt 52b.

The coil spring 60 is disposed such that its front end is in contact with the bottom of the plunger hole 41 of the plunger 40 while its rear end is in contact with the front face of the flanges 52c of the retainer 52, and configured to bias the plunger 40 toward the front side, as shown in FIG. 2 and FIG. 3.

While the coil spring 60 is disposed such that its rear end is in contact with the flanges 52c of the retainer 52 in this embodiment, the way how the rear end of the coil spring 60 is disposed is not limited to the example described above. For example, the rear end of the coil spring 60 may be disposed on the radially outer side of the flanges 52c without making contact therewith.

While embodiments of the present invention have been described in detail, the present invention is not limited to the above-described embodiments and may be carried out with various design changes without departing from the scope of the present invention set forth in the claims.

For example, while the tensioner was described as a component to be incorporated in a timing system of a car engine in the embodiments above, the purpose of use of the tensioner is not limited to this specific application.

Also, while the tensioner was described as a component that applies tension to a transmission chain with a tensioner lever in the embodiments above, the plunger can directly guide the transmission chain slidably with a distal end thereof to apply tension to the transmission chain.

The tensioner may not necessarily be applied to a transmission mechanism with a transmission chain but can also be used for similar transmission mechanisms that use belts, ropes and the like, and can be applied in a variety of industrial fields where it is required to apply tension to an elongated component.

In the embodiment described above, the sleeve is disposed inside the tensioner body that is attached to a part in the surroundings of the tensioner such as an engine block or the like. Instead, the sleeve may be directly attached to the engine block or the like.

What is claimed is:

1. A tensioner comprising:

a sleeve having a sleeve bottom on a rear side;

a plunger inserted in the sleeve so as to be able to move forward and backward along an axial direction of the sleeve; and a biasing unit that is accommodated so as to be able to expand and contract inside an oil pressure chamber formed between a rear end of the sleeve and a rear end of the plunger and that biases the plunger toward a front side, wherein an oil supply hole is formed in the sleeve bottom, a check valve for preventing oil from flowing out from the oil supply hole is disposed on a front face of the sleeve bottom, the check valve includes a check ball, and a retainer disposed on the front face of the sleeve bottom and restricting movement of the check ball, the sleeve bottom includes a ball seat which protrudes in a cylindrical shape toward the front side integrally with and continuously from an edge of the oil supply hole and on which the check ball is seated, the sleeve including the ball seat is an unitary single piece, and a tapered portion with a diameter increasing from the front side toward the rear side is formed on a rear side of an inner periphery of the oil supply hole.

2. The tensioner according to claim 1, wherein the retainer includes a top disposed on the front side of the check ball, and a skirt extending vertically downward toward the rear side from a peripheral edge of the top and disposed on a radially outer side of the ball seat, the ball seat and the skirt decreasing in diameter from the front side toward the rear side.

3. The tensioner according to claim 2, wherein the skirt includes a plurality of circumferentially arranged slits extending from a rear end of the skirt toward the front side.

4. The tensioner according to claim 1, wherein the ball seat, the oil supply hole, and the tapered portion are plastically deformed by drawing on the sleeve bottom.

* * * * *